United States Patent
Wang

(10) Patent No.: US 11,201,727 B2
(45) Date of Patent: *Dec. 14, 2021

(54) SYSTEM AND METHOD FOR MANAGING USER INTERACTIONS WITH A BLOCKCHAIN

(71) Applicant: ADVANCED NEW TECHNOLOGIES CO., LTD., Grand Cayman (KY)

(72) Inventor: Shifeng Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 266 days.

This patent is subject to a terminal disclaimer.

(21) Appl. No.: 16/496,342

(22) PCT Filed: Mar. 27, 2019

(86) PCT No.: PCT/CN2019/079801
§ 371 (c)(1),
(2) Date: Sep. 20, 2019

(87) PCT Pub. No.: WO2019/120319
PCT Pub. Date: Jun. 27, 2019

(65) Prior Publication Data
US 2020/0313857 A1 Oct. 1, 2020

(51) Int. Cl.
*G06F 16/903* (2019.01)
*H04L 9/06* (2006.01)
(Continued)

(52) U.S. Cl.
CPC .............. *H04L 9/0637* (2013.01); *G06F 8/20* (2013.01); *G06F 16/903* (2019.01);
(Continued)

(58) Field of Classification Search
CPC ...... G06F 9/44526; G06F 16/903; G06F 8/41; H04L 2209/38; H04L 9/0643;
(Continued)

(56) References Cited

U.S. PATENT DOCUMENTS 10,013,573 B2   7/2018 Dillenberger
10,095,549 B1  10/2018 Needham et al.
(Continued)

FOREIGN PATENT DOCUMENTS

CN  1929396 A    3/2007
CN  101135966 A  3/2008
(Continued)

OTHER PUBLICATIONS

First Search for Chinese Application No. 201980001569.0 dated Aug. 20, 2020.
(Continued)

*Primary Examiner* — Olugbenga O Idowu

(57) ABSTRACT

Methods, systems, and apparatus, including computer programs encoded on computer storage media, for managing user interactions with a blockchain. One of the methods includes: receiving a user input in a command line interface (CLI), wherein the user input comprises a reference to one or more configurations; determining, by a command manager based on the user input, a blockchain-related operation and a command plug-in associated with the blockchain-related operation; generating, by the determined command plug-in, a command based on the determined operation and the one or more configurations; and sending, by a software development kit (SDK) associated with the blockchain, the command to one or more nodes associated with the blockchain.

20 Claims, 9 Drawing Sheets

(51) Int. Cl.
    *G06F 8/20* (2018.01)
    *H04L 9/32* (2006.01)
(52) U.S. Cl.
    CPC .......... *H04L 9/0643* (2013.01); *H04L 9/3247* (2013.01); *H04L 2209/38* (2013.01)
(58) Field of Classification Search
    CPC ............... H04L 9/3247; H04L 67/1002; H04L 67/1097; H04L 67/12
    See application file for complete search history.

(56) References Cited

U.S. PATENT DOCUMENTS

| | | | |
|---|---|---|---|
| 10,270,770 | B1 | 4/2019 | Irwan et al. |
| 10,365,922 | B1 | 7/2019 | Wang et al. |
| 10,445,698 | B2 | 10/2019 | Hunn |
| 10,503,905 | B1 | 12/2019 | Misra et al. |
| 10,528,890 | B1 | 1/2020 | Boston et al. |
| 2003/0069956 | A1 | 4/2003 | Gieseke et al. |
| 2007/0177898 | A1 | 8/2007 | Shin |
| 2008/0209316 | A1 | 8/2008 | Zandstra |
| 2010/0257539 | A1 | 10/2010 | Narayanan et al. |
| 2015/0161108 | A1 | 6/2015 | Back |
| 2016/0012465 | A1 | 1/2016 | Sharp |
| 2017/0177898 | A1 | 6/2017 | Dillenberger |
| 2018/0047111 | A1 | 2/2018 | Vieira et al. |
| 2018/0089256 | A1 | 3/2018 | Wright, Sr. |
| 2018/0204190 | A1 | 7/2018 | Moy et al. |
| 2018/0218455 | A1 | 8/2018 | Kolb et al. |
| 2018/0247191 | A1 | 8/2018 | Katz et al. |
| 2018/0285810 | A1 | 10/2018 | Ramachandran et al. |
| 2018/0287893 | A1 | 10/2018 | O'brien et al. |
| 2018/0367528 | A1 | 12/2018 | Schwarz et al. |
| 2019/0027237 | A1 | 1/2019 | Mcfarlane |
| 2019/0095992 | A1 | 3/2019 | Soh |
| 2019/0097895 | A1 | 3/2019 | Hansen et al. |
| 2019/0098082 | A1 | 3/2019 | Hansen et al. |
| 2019/0102423 | A1 | 4/2019 | Little et al. |
| 2019/0104196 | A1 | 4/2019 | Li et al. |
| 2019/0180311 | A1 | 6/2019 | Chan et al. |
| 2019/0286102 | A1 | 9/2019 | Carbone et al. |
| 2019/0289031 | A1 | 9/2019 | Kozloski et al. |
| 2019/0363889 | A1 | 11/2019 | Wang |
| 2020/0005292 | A1* | 1/2020 | Mao .................... H04L 9/3247 |
| 2020/0118127 | A1 | 4/2020 | Miller |
| 2020/0142986 | A1 | 5/2020 | Ragnoli et al. |
| 2020/0278958 | A1* | 9/2020 | Zhang ................ G06Q 20/3678 |

FOREIGN PATENT DOCUMENTS

| | | |
|---|---|---|
| CN | 108769173 A | 11/2018 |
| CN | 108921551 A | 11/2018 |
| CN | 109345159 A | 2/2019 |

OTHER PUBLICATIONS

Written Opinion for Singaporean Application No. 11201908937R dated Sep. 21, 2020.
Preinterview first office action for U.S. Appl. No. 16/742,710 dated Apr. 6, 2020.].
Written Opinion of the International Searching Authority and International Search Report for PCT Application No. PCT/CN2019/079801 dated Dec. 30, 2019.
Notice of Allowance for U.S. Appl. No. 16/742,710 dated May 28, 2020.
Search Report for European Application No. 19732233.2 dated Jun. 12, 2020.
Examination Report for European Application No. 19732233.2 dated Jun. 25, 2020.
Anonymous, "hyperledger-fabricdocs Documentation", Mar. 6, 2018.

* cited by examiner

400

410: receiving a user input in a command line interface (CLI), wherein the user input comprises a reference to one or more configurations 420: determining, using a command manager based on the user input, a blockchain-related operation and a command plug-in associated with the blockchain-related operation 430: generating, using the determined command plug-in, a command based on the determined operation and the one or more configurations 440: sending, using a software development kit (SDK) associated with a blockchain, the command to one or more nodes associated with the blockchain 450: obtaining, using the SDK, an output in response to the command from the blockchain 460: providing the output in the CLI

FIG. 4

SYSTEM AND METHOD FOR MANAGING USER INTERACTIONS WITH A BLOCKCHAIN

CROSS REFERENCE TO RELATED APPLICATION

This application is a national phase application of International Application No. PCT/CN2019/079801, filed on Mar. 27, 2019, the contents of which are incorporated by reference in its entirety.

TECHNICAL FIELD

This application generally relates to methods and devices for managing user interactions with a blockchain.

BACKGROUND

A blockchain may comprise a growing list of records contained in blocks linked using cryptography. Each block of a blockchain may contain transaction information, account information, information about one or more previous blocks, and other related information. A blockchain may be implemented in a peer-to-peer network comprising a plurality of nodes adhering to a protocol for inter-node communication, transaction or block validation, and consensus formation. A user may interact with a blockchain using script commands or one or more application programming interfaces ("APIs") associated with the blockchain. Such methods may be user-unfriendly and specific to particular blockchains and may require repetitive input of configuration information. In developing blockchain-related applications or products, developers may have to use the aforementioned methods to interact with the blockchain, which may require substantial expertise and efforts when implementing even simple functionalities. The efficiency of developing and verifying such applications or products may thereby be constrained by the limitations of the existing interface options.

SUMMARY

Various embodiments of the specification include, but are not limited to, systems, methods, and non-transitory computer readable media for managing user interactions with a blockchain.

According to some embodiments, a computer-implemented method for managing user interactions with a blockchain may comprise receiving a user input in a command line interface ("CLI"), wherein the user input comprises a reference to one or more configurations, determining, by a command manager based on the user input, a blockchain-related operation and a command plug-in associated with the blockchain-related operation, generating, by the determined command plug-in, a command based on the determined operation and the one or more configurations, and sending, by a software development kit (SDK) associated with the blockchain, the command to one or more nodes associated with the blockchain.

In some embodiments, the method may further comprise obtaining, by the SDK, an output in response to the command from the blockchain and providing the output in the CLI.

In embodiments of the specification, the method may further comprise, before the receiving a user input, initializing a console for managing user interactions with the blockchain, wherein the console comprises a mainframe, the CLI, the command manager, a plurality of command plug-ins, and the SDK. The initializing may comprise starting the mainframe associated with the console, generating, by the mainframe, an instance of the CLI, initializing, by the CLI, the SDK based on one or more configurations associated with one or more nodes associated with the blockchain, calling, by the CLI, the command manager, and loading, by the command manager, the command plug-ins for registration into the instance of the CLI.

According to some embodiments, the console may further comprise a tool manager configured to calculate a hash value, calculate a digital signature, or verify a blockchain transaction.

In some embodiments, the CLI may be configured to pre-process the user input, provide a historical record of user inputs, or provide a recommended command.

In embodiments of the specification, the command manager may be configured to register or remove one or more commands.

According to some embodiments, the command manager may be configured to provide, in the CLI, a list of registered commands and information about the registered commands.

In some embodiments, the command plug-in may comprise a transaction plug-in, a block plug-in, or an event plug-in.

In embodiments of the specification, the transaction plug-in may be configured to generate a command for adding a blockchain transaction to the blockchain, a command for querying for information about one or more blockchain transactions associated with the blockchain, or a command for querying for information about one or more accounts associated with the blockchain.

According to some embodiments, the block plug-in may be configured to generate a command for querying for information about a block associated with the blockchain or a command for querying for information about a block header associated with the blockchain.

In some embodiments, the event plug-in may be configured to generate a command for subscribing to events related to a blockchain contract associated with the blockchain, a command for subscribing to events related to a block associated with the blockchain, a command for subscribing to events related to an account associated with the blockchain, or a command for subscribing to events related to a topic associated with the blockchain.

In embodiments of the specification, the sending the command to one or more nodes associated with the blockchain may comprise obtaining, from the user input, a reference to the blockchain, selecting, from a plurality of SDKs, the SDK associated with the referenced blockchain, and feeding the generated command to the SDK.

According to some embodiments, the blockchain may be a consortium blockchain.

In some embodiments, a system for managing user interactions with a blockchain may comprises one or more processors and one or more computer-readable memories coupled to the one or more processors and having instructions stored thereon that are executable by the one or more processors to perform the method of any of the preceding embodiments.

In some embodiments, an apparatus for managing user interactions with a blockchain may comprise a plurality of modules for performing the method of any of the preceding embodiments.

According to some embodiments, a system for managing user interactions with a blockchain may comprise one or more processors and one or more computer-readable memories coupled to the one or more processors and having instructions stored thereon that are executable by the one or more processors to perform operations comprising receiving a user input in a CLI, wherein the user input comprises a reference to one or more configurations, determining, by a command manager based on the user input, a blockchain-related operation and a command plug-in associated with the blockchain-related operation, generating, by the determined command plug-in, a command based on the determined operation and the one or more configurations, and sending, by an SDK associated with the blockchain, the command to one or more nodes associated with the blockchain.

In embodiments of the specification, a non-transitory computer-readable storage medium may be configured with instructions executable by one or more processors to cause the one or more processors to perform operations comprising receiving a user input in a CLI, wherein the user input comprises a reference to one or more configurations, determining, by a command manager based on the user input, a blockchain-related operation and a command plug-in associated with the blockchain-related operation, generating, by the determined command plug-in, a command based on the determined operation and the one or more configurations, and sending, by an SDK associated with the blockchain, the command to one or more nodes associated with the blockchain.

According to some embodiments, an apparatus for managing user interactions with a blockchain may comprise a receiving module for receiving a user input, wherein the user input comprises a reference to one or more configurations, a determining module 820 for determining, based on the user input, a blockchain-related operation and a command plug-in associated with the blockchain-related operation, a generating module 830 for generating, by the determined command plug-in, a command based on the determined operation and the one or more configurations, and a sending module 840 for sending the command to one or more nodes associated with the blockchain.

Embodiments disclosed herein have one or more technical effects. In some embodiments, the methods and devices integrate an SDK associated with a blockchain with a console comprising various other components for converting user inputs in a CLI to commands compatible with the blockchain and converting information associated with the blockchain to information conceivable to the user. This allows interactions with a blockchain using programming languages or protocols other than those native to the blockchain. According to some embodiments, a command manager and one or more command plug-in load and register preset commands corresponding to operations associated with the blockchain to the console. This allows execution of operations associated with a blockchain using simple input and automatic application of existing configurations and parameters associated with the operations. In yet other embodiments, the console includes code modules that can be independently modified or replaced. This enables smooth and effective extension and modification of commands executable by the console. In still other embodiments, the methods and devices provide an interface compatible with a plurality of SDKs associated with a plurality of blockchains. This allows interaction with different blockchains using a single and consistent protocol and command set.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 4 illustrates an example of a method for managing user interactions with a blockchain.

DETAILED DESCRIPTION

Figure 1:
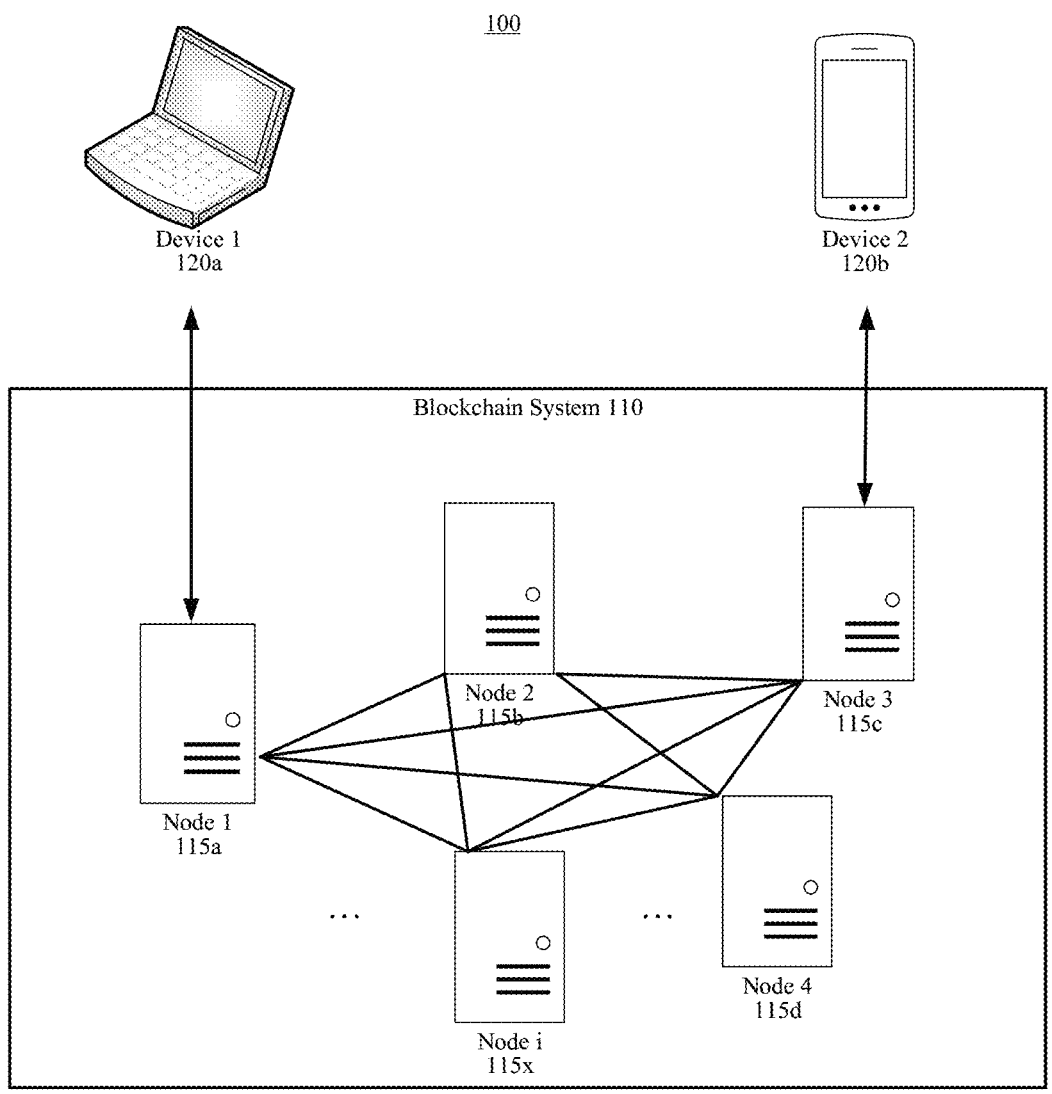
FIG. 1 illustrates an example of a network environment associated with a blockchain.

Embodiments described herein provide methods, systems, and apparatus associated with a console for managing user interactions with a blockchain. The console may be designed to have a modularized structure and to comprise a plurality of code modules. Each of the code modules may correspond to particular operations performed in a pipeline for providing an interface that allows a user to interact with the blockchain. In some embodiments, the console may integrate various functionalities associated with a blockchain (e.g., those related to blockchain transactions, blocks, events) by incorporating and packaging an SDK (or related APIs) associated with the blockchain and provide a unified entry or interface to the blockchain.

In some embodiments, the console may comprise a mainframe, a command line interface ("CLI"), a command manager, a transaction plug-in, a block plug-in, an event plug-in, a blockchain SDK, a tool manager, one or more other components, or any combination thereof. In some embodiments, the console may receive a user input in a CLI and determine, by a command manager based on the user input, a blockchain-related operation. The command manager may call a command plug-in associated with the blockchain-related operation, which may then generate a command based on the determined operation and one or more related configurations. The blockchain SDK may send the command to one or more nodes associated with the blockchain. The blockchain SDK may also obtain an output in response to the command from the blockchain and provide the output in the CLI. The console may allow a user to conveniently specify configuration files and use command lines to achieve operations such as sending or querying blockchain transactions, subscribing to block events or account events, or other suitable operations. In this manner, the console may convert user input to commands acceptable to the blockchain and convert information obtained from a blockchain to information conceivable to the user, thus enabling user interaction with the blockchain.

Embodiments described herein provide a user-friendly solution for interacting with a blockchain via a terminal emulator. They may be applied in various blockchain-based applications. The blockchains may range from one created to be compatible with the console to an open-source publicly-available blockchain. The modularized design of the console may provide strong extendibility and versatility. Classes of commands may be easily integrated into the console as plug-ins as long as they stay within the limitations of the blockchain SDK and conform to its data specifications. New commands may be conveniently stored and registered by the command manager for use by the user. Furthermore, the console may be simultaneously compatible with multiple blockchains as long as it includes an SDK for each of the blockchains and each SDK conforms to the input or output protocols of the console. This allows individual users to customize their manner of interaction with a blockchain and to efficiently interact with the blockchain through a unified and user-friendly interface.

In various embodiments, the disclosed systems, methods, and non-transitory computer readable media may be based on various types of blockchains depending on who is allowed to participate in the network, execute the consensus protocol, and maintain the shared blockchain ledger. The various types of blockchain may include, for example, public blockchain, consortium blockchain, private blockchain, etc. A blockchain may be considered a decentralized or partially centralized database, commonly referred to as a distributed ledger because the operation is performed by various nodes (e.g., computing devices) in a network. Information may be written to the blockchain and saved or read from it. Nodes are, for example, computing devices or large computer systems that support the blockchain network. Each node may provide a part or all of the functions of the blockchain. For example, a node that provides consensus verification may be referred to as a consensus-participating node (or consensus node). Consensus may be an algorithm of rules for a network of blockchain nodes to achieve commonly-accepted processing results. Through consensus, data is continuously added into a chain of blocks.

A consortium blockchain may refer to a blockchain with consensus procedures controlled by preset nodes. The blockchain may allow everyone or only approved participants to access or adopt a hybrid access method. For example, a root hash and an Application Program Interface ("API") may be open to the public; external parties are allowed to use an API to make a certain number of inquiries and obtain information relating to blockchain status. Consortium blockchains may be understood by comparison with public blockchains. A public blockchain may impose no access restriction. Anyone with an internet connection may become a participant of a public blockchain by accessing data included on the blockchain and executing blockchain transactions, participating in the consensus process for the blockchain. A public blockchain may be considered to be fully decentralized, with control over the blockchain not being in the hands of any single individual or entity. A consortium blockchain may differ from a public blockchain in that it is permissioned. Only permissioned individuals or entities may become participates of the consortium blockchain. A consortium blockchain may be semi-decentralized. Control over a consortium blockchain may be granted to a group of approved individuals or entities or a group of nodes on the network. A consortium blockchain may possess the security features that are inherent in public blockchains, whilst also allowing for a greater degree of control over the network.

FIG. 1 illustrates an example of a network environment 100 associated with a blockchain. The network environment may comprise a blockchain system 110 that may support and maintain a blockchain referred to in various embodiments herein. The blockchain system 110 may comprise a plurality of nodes 115 (e.g., node 1 115a, node 2 115b, node 3 115c, node 4 115d, one or more nodes i 115x). The nodes may communicate with each other and form a network (e.g., a peer-to-peer network). The nodes 115 may be implemented in servers, computers, mobile electronic devices, other suitable devices, or any combination thereof. Each node 115 may correspond to one or more physical hardware devices or virtual devices coupled together via various types of communication methods such as TCP/IP. The nodes 115 may comprise full nodes, Geth nodes, consensus nodes, other suitable nodes, or any combination thereof. Each node 115 may or may not store a full copy of a distributed ledger associated with the blockchain. Each node 115 may be configured to perform operations such as storing one or more identifiers of an account, creating blockchain transactions, validating blockchain transactions, aggregating blockchain transactions to create blocks, validating blocks, discovering and maintaining connections to peer nodes, creating blockchain contracts (e.g., smart contracts), executing blockchain contracts, obtaining information by inspecting the blockchain, or one or more other suitable operations.

In some embodiments, the blockchain may record a plurality of blockchain transactions. A blockchain transaction may correspond to transfer of value, creation of a blockchain contract, execution of a blockchain contract, other operations, or any combination thereof. The blockchain transaction may comprise information such as one or more identifiers referencing one or more previous blockchain transactions, accounts, blocks, or blockchain contracts, one or more cryptographic keys, one or more digital signatures created based on cryptographic keys, one or more hash values, or other suitable information. If a transaction involves a blockchain contract, a node 115 receiving the transaction may execute the blockchain contract locally. A blockchain contract may comprise a computer program configured to automatically execute an operation based on required input or states. A blockchain contract may comprise user-written contract code, one or more identifiers, one or more hash values, transaction information, other suitable information, or any combination thereof. A blockchain contract deployed on the nodes associated with the blockchain may be later accessed through its corresponding address on the blockchain for execution. Data stored in the deployed blockchain contract may be retrieved from the blockchain.

In some embodiments, one or more devices 120 (e.g., Device 1 120a, Device 2 120b) may interact with the blockchain associated with the blockchain system 110 by interacting with one or more nodes 115. The console disclosed herein may be implemented on a device 120 and may be used to interact with the blockchain. Each device 120 may or may not be a node of the blockchain system 110. In some embodiments, a device 120 may add a blockchain transaction to the blockchain. The device 120 may generate a blockchain transaction and send it to one or more nodes 115 of the blockchain system 110. When a node 115 receives the blockchain transaction, it may independently validate the blockchain transaction and, if validated, forward the blockchain transaction to one or more other nodes 115. One or more of the nodes 115 may maintain a local pool of blockchain transactions and aggregate a plurality of the blockchain transactions into a block. Each block may comprise a header, a body, and one or more other fields. Each block may store information related to one or more blockchain transactions, one or more accounts, one or more previous blocks, one or more blockchain contracts, proof of validity of the block, other suitable information, or any combination thereof. The information may be integrated in the block using, for example, hash algorithms and tree data structures. Each node 115 may send a successfully formed block to one or more other nodes 115 for addition to the blockchain and may receive one or more blocks from other nodes 115, which may be validated and added to a locally-stored blockchain. In some embodiments, a device 120 may obtain information associated with the blockchain from one or more of the nodes 115. In particular, the device 120 may send a request to one or more nodes 115 of the blockchain system 110 for such information. The nodes 115 may query one or more blocks of the blockchain for the requested information and send it to the device 120. The device 120 may also obtain information about the blockchain from a locally stored copy of the blockchain.

Figure 2:
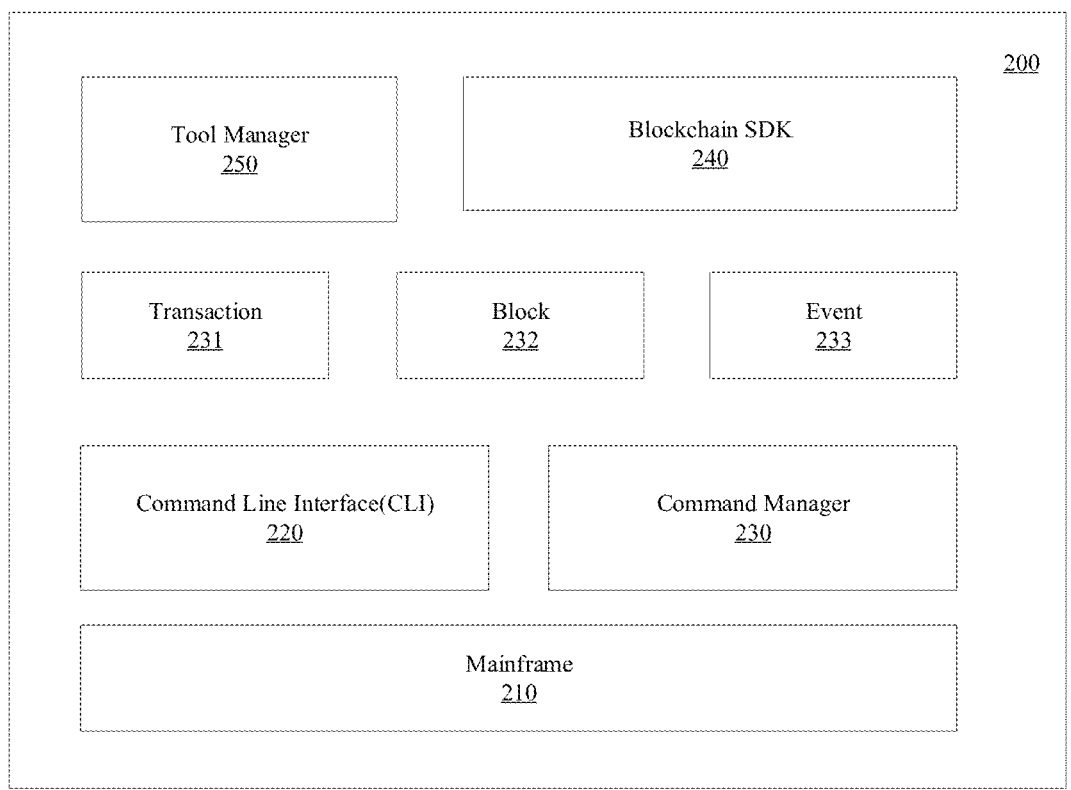
FIG. 2 illustrates an example of a console for managing user interactions with a blockchain.

FIG. 2 illustrates an example of a console 200 for managing user interactions with a blockchain. The console 200 may comprise a plurality of components or modules implemented in software (e.g., instructions stored in a memory) and/or hardware (e.g., processor). In some embodiments, the console 200 may comprise a mainframe 210, a CLI 220, a command manager 230, a transaction plug-in 231, a block plug-in 232, an event plug-in 233, a blockchain SDK 240, and a tool manager 250.

In some embodiments, the mainframe 210 may provide an entry to the console 200 or starting point in using the console 200. A user may start the console 200 by starting the mainframe 210. The mainframe 200 may then provide a terminal emulator to the user by calling, loading, initializing, or configuring one or more other components of the console 200 including, for example, the CLI 220, the command manager 230, the blockchain SDK 240, and the tool manager 250.

In some embodiments, the CLI 220 may provide an interface to receive user input, manage user interactions, cache user input, and display information to the user. The CLI 220 may also be configured to pre-process user input, to provide a historical record of user inputs, or to provide a recommended command In some embodiments, the CLI 220 may be configured to load and register the command manager 230 and communicate with the command manager 230. In some embodiments, the CLI 220 may provide an interface for a user to input one or more commands as well as configuration information and parameters. A command inputted by a user may be directly forwarded to the command manager. In other embodiments, the CLI 220 may provide interactive services to aid a user for inputting a command. For example, the CLI 220 may pre-process an input by a user or provide one or more historical record of user inputs for display and use by the user. The CLI 220 may also provide one or more suggested commands to the user in response to the user inputting a command class, a request for help, or several first letters of a command. The CLI 220 may load one or more public or default configurations or global parameters (e.g., information about a node associated with a blockchain to establish a connection with) automatically or in response to a user input. Such configurations or parameters will then be applied to a subsequent input by the user to perform particular operations associated with the blockchain (e.g., querying for a blockchain transaction).

In some embodiments, the command manager 230 may interpret a user input in the CLI 220 to determine a blockchain-related operation associated with the user input. The command manager 230 may be configured to register or remove one or more commands. The command manager 230 may maintain a list of registered commands that can be used by the user with the console 200. It may provide, for display in the CLI 220, a list of registered commands and information about the registered commands. The user may provide an input corresponding to one or more of the registered commands. The command manager may manage one or more command interfaces for sending commands associated with a blockchain. The command interfaces may be implemented as one or more command plug-ins to the console 200 including, for example, a transaction plug-in 231, a block plug-in 232, an event plug-in 233, other suitable command plug-ins or interfaces (e.g., a command plug-in for privacy-related commands), or any combination thereof. Via the command interfaces, the command manager 230 may generate one or more commands corresponding to the blockchain-related operation determined from the user input and communicate such commands to the blockchain SDK 240 for transmission to one or more nodes associated with the blockchain. In this manner, the command manager 230 may manage a user's interactions with the blockchain.

In some embodiments, the command manager 230 may be configured to register or generate a plurality of commands. The commands may comprise one or more commands for performing account operations, one or more commands for obtaining account queue information, one or more commands for querying for block information (e.g., according to a block number), one or more commands for querying for block header information (e.g., according to a block number or hash), one or more commands for obtaining a block queue in cache that may comprise verified or unverified blocks, one or more commands for querying for information about a consensus status of a plurality of blockchain nodes with respect to particular transactions or blockchain states, one or more commands for creating, editing, compiling, or deploying blockchain contracts, one or more commands for dumping or storing information associated with the blockchain in a database, one or more commands for subscribing to events, contracts, or blocks, one or more commands for performing group related operations, one or more commands for querying for or setting logging levels for messages or logs generated by one or more components of the console or other suitable tools, the logging levels reflecting, for example, importance or severity of such messages or logs, one or more commands for querying for metrics information associated with a blockchain node (e.g., number of transactions or queries received by the blockchain node in a certain period), one or more commands for obtaining information about one or more blockchain nodes, one or more commands for performing privacy-related operations, one or more commands for sending blockchain transactions to blockchain nodes, one or more commands for determining whether a blockchain node is synchronizing information (e.g., information associated with one or more blocks) from one or more other nodes, one or more commands for obtaining information about one or more blockchain contracts inherent to the blockchain system (e.g., a blockchain contract deployed since the creation of the blockchain system), one or more commands for generating or configuring transaction operations, one or more commands for obtaining a transaction queue in a cache comprising verified or unverified blockchain transactions, one or more commands for exiting a current operation, one or more other suitable commands, or any suitable combination thereof.

In some embodiments, the command manager 230 may generate one or more of the commands using one or more command interfaces or command plug-ins. For example, FIG. 2 illustrates a transaction plug-in 231, a block plug-in 232, and an event plug-in 233. The console 200 may comprise one or more of the illustrated command plug-ins as well as other suitable command plug-ins. Each command plug-in may be configured to generate a particular type or group of commands In some embodiments, the transaction plug-in 231 may provide an interface to access blockchain transactions associated with a blockchain and commands for managing such blockchain transactions. In particular, it may be configured to generate one or more commands for adding a blockchain transaction to the blockchain, one or more commands for querying for information about one or more blockchain transactions associated with the blockchain, one or more commands for querying for information about one or more accounts associated with the blockchain, other suitable transaction-related commands, or any combination thereof. In some embodiments, the block plug-in 232 may provide an interface to access information about blocks associated with a blockchain and facilitates synchronous access to the blocks. In particular, it may be configured to generate one or more commands for querying for information about a block associated with the blockchain, one or more commands for querying for information about a block header associated with the blockchain, other suitable block-related commands, or any combination thereof. In some embodiments, the event plug-in 233 may provide an interface to access information about events associated with a blockchain. In particular, it may be configured to generate one or more commands for subscribing to events related to a blockchain contract associated with the blockchain; one or more commands for subscribing to events related to a block associated with the blockchain, one or more commands for subscribing to events related to an account associated with the blockchain, one or more commands for subscribing to events related to a topic (e.g., of occurrence of blockchain transactions containing a particular keyword, occurrence a particular type of blockchain transactions) associated with the blockchain, one or more other event-related commands, or any combination thereof.

In some embodiments, the blockchain SDK 240 may comprise one or more APIs associated with the blockchain enabling various operations on the blockchain (e.g., transaction-related operations, block-related operations, event-related operations). The SDK 240 may also comprise data specifications for its input and output. The SDK 240 may be configured to conform to one or more protocols associated with the console 200 so as to receive data in the format output by one or more other components of the console 200 (e.g., the command manager 230, the command plug-ins 231, 232, and 233). Alternatively, one or more other components of the console 200 may be configured to conform to one or more protocols or data specifications associated with the SDK 240 in order to feed data in correct formats to and interface with the blockchain SDK 240. The SDK 240 may be tailored to a particular blockchain. The blockchain may be a public blockchain, a private blockchain, a consortium blockchain, another type of blockchain, or any combination thereof.

In some embodiments, the console 200 may enable convenient adaptation to a different blockchain. In particular, in order to adapt to a new blockchain, the SDK 240 for an existing blockchain may be replaced with a new SDK associated with the new blockchain. The new SDK may similarly conform with the data specification for the other components of the console 200. Such replacement may change packaging of an interactive interface with the blockchain without changing the user interface and enable the user to conveniently navigate different blockchains using the same command interface.

In some embodiments, the console 200 may comprise a plurality of blockchain SDKs 240. Each of the SDKs 240 may be associated with a particular blockchain and compatible with the other components of the console 200. This enables the console 200 to support interactions with multiple blockchains. In some embodiments, a user input received in the CLI 220 may comprise a reference to one of the blockchains supported by the console. The console 200 may select, from the plurality of SDKs 240, an SDK 240 corresponding to the referenced blockchain. A command generated by the command manager 230 or one or more of the command plug-ins 231, 232, and 233 may be fed to the selected SDK for transmission to one or more nodes of the referenced blockchain.

In some embodiments, the tool manager 250 may comprise a plurality of tools supporting one or more functionalities associated with one or more other components. For example, the tool manager 250 may be configured to calculate a hash value (e.g., numeric result of applying a hash algorithm to data), calculate a digital signature (e.g., data string uniquely identifying an account calculated based on a cryptographic key), verify a blockchain transaction, to perform other suitable operations, or to perform any combination of the above-listed operations. The functionalities supported by the tool manager 250 may comprise generating and sending a blockchain transaction, subscribing to events, other suitable functionalities, or any combination thereof. In executing one or more operations, another component may call the tool manager 250 for a particular sub-step of the operation and continue the one or more operations based on an output by the tool manager 250. As an example, the transaction plug-in 231 may call the tool manager 250 when generating a blockchain transaction, so that the tool-manager may calculate a digital signature and a hash value associated with the blockchain transaction. The tool manager 250 may send the results of the calculations back to the transaction plug-in 231, which may then generate the blockchain transaction based on the results. In some embodiments, one or more functionalities of the tool manager 250 may not be integrated as a single module, but rather be distributed among a plurality of components associated with the console 200. For example, the functionality of generating a digital signature may be integrated into the transaction plug-in 231 in the example above.

Figure 3:
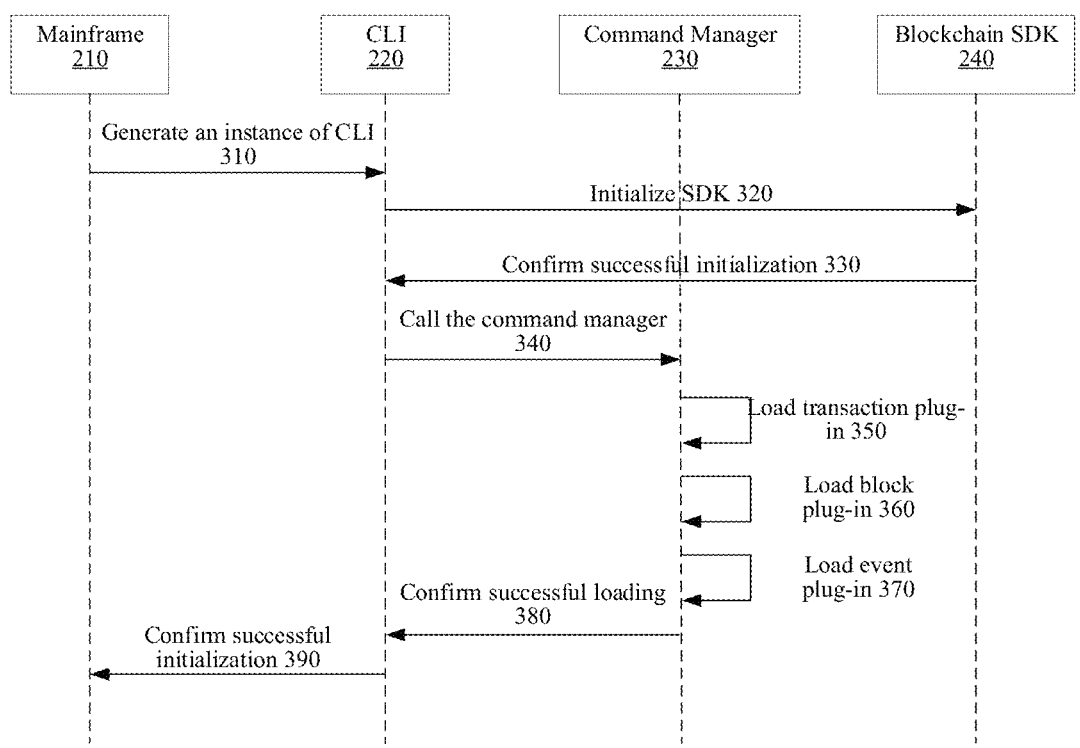
FIG. 3 illustrates an example of a method for initializing an example console for managing user interactions with a blockchain.

FIG. 3 illustrates an example of a method for initializing an example console 200 for managing user interactions with a blockchain. This method may be performed by a mainframe 210, a CLI 220, a command manager 230, and a blockchain SDK 240. In some embodiments, the console 200 may be initialized before inputs and outputs can be processed. The method illustrated in FIG. 3 start when the mainframe 210 associated with the console 200 is started. At step 310, the mainframe 210 may generate an instance of the CLI 220 by calling the CLI 220. The instance of the CLI 220 may be generated based on one or more configurations associated with the console 200. In some embodiments, the mainframe 210 may generate one or more other instances of the CLI 220 that may be open simultaneously, each instance may or may not be associated with the same configurations.

At step 320, the instance of the CLI 220 may load and initialize the blockchain SDK 240 based on one or more configurations associated with one or more nodes associated with the blockchain. The SDK 240 may provide one or more APIs for visiting the blockchain. The SDK 240 may return a confirmation acknowledging successful initialization at step 330. After loading the SDK 240, the CLI 220 may call the command manager 230 at step 340. The command manager 230 may then load the command plug-ins. It may load the transaction plug-in 231 at step 350, the block plug-in 232 at step 360, and the event plug-in 233 at step 370. By doing so, the command manager 230 may register one or more commands associated with each of the command plug-ins into the instance of the CLI 220. Then, at step 380, the command manager 230 may return a confirmation acknowledging successful loading to the CLI 220. At step 390, the CLI 220 may return a confirmation acknowledging successful initialization to the mainframe 210. At this point, the initialization process may be completed and the mainframe 210 may quit the initialization process. The console 200 may provide the interaction services by receiving user inputs in the CLI 220.

FIG. 4 illustrates an example of a method 400 for managing user interactions with a blockchain. In some embodiments, the various components of the console 200 may execute corresponding operations in a particular order to enable user interactions with a blockchain. The method illustrated in FIG. 4 may begin at step 410, where the console 200 may receive a user input in a CLI 220. The user input may comprise a reference to one or more configurations. The configurations may comprise, for example, information of one or more nodes associated with the blockchain to communicate to, information of one or more accounts associated with the blockchain, information of one or more blocks associated with the blockchain, one or more private keys or public keys, one or more parameters and initial settings, one or more classes of commands, other suitable configuration information, or any combination thereof. The configurations may be stored in one or more files accessible to the console 200. The reference to the configurations may comprise one or more file names, directories, or addresses of the configuration files.

At step 420, the command manager 230 may determine, based on the user input, a blockchain-related operation and a command plug-in associated with the blockchain-related operation. Here, the blockchain-related operation may comprise, for example, adding a blockchain transaction to the blockchain, querying for information associated with the blockchain, uploading a blockchain contract to the blockchain, creating an account, another suitable operation, or any combination thereof. The command plug-in may comprise a transaction plug-in 231, a block plug-in 232, an event plug-in 233, other suitable command plug-ins, or any combination thereof.

At step 430, the command plug-in determined by the command manager 230 may generate a command based on the determined operation and the one or more configurations. Then, at step 440, the SDK 240 associated with the blockchain may send the command to one or more nodes associated with the blockchain.

In some embodiments, after the command is sent to one or more nodes associated with the blockchain, information associated with the command may be added to or modified in the blockchain. At step 450, the SDK 240 may obtain an output in response to the command from the blockchain. For example, the SDK 240 may obtain the output by scanning one or more copies of the blockchain stored at one or more blockchain nodes 115 to obtain one or more new blocks created subsequent to sending of the command From the new blocks, the SDK 240 may obtain data about, for example, one or more new transactions related to the command, changes to one or more accounts related to the command, changes to one or more blockchain contracts related to the command, other suitable data, or any combination thereof. At step 460, the output may be provided in the CLI 220. In this manner, the console 200 may convert the user input to commands acceptable to a network associated with the blockchain and convert the output from the blockchain into information conceivable to the user, thereby managing interactions between the user and the blockchain.

Figure 5:
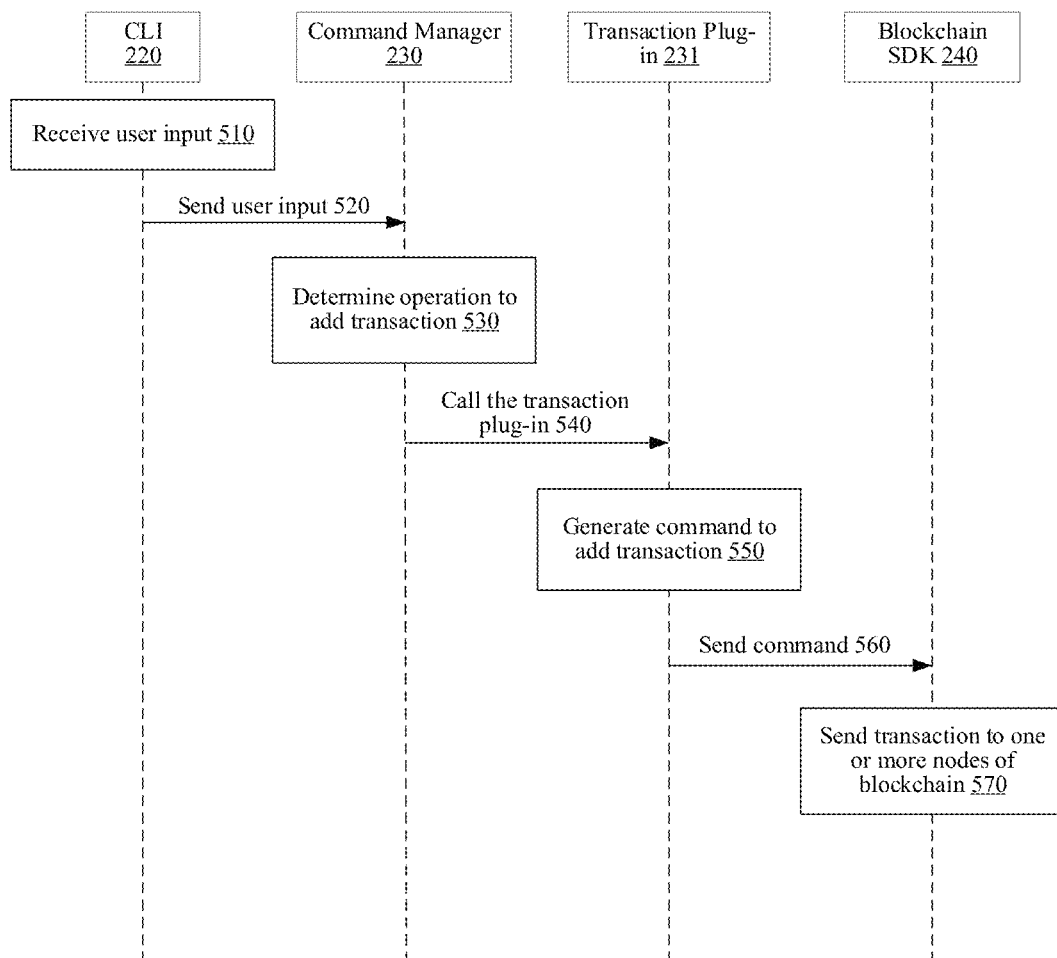
FIG. 5 illustrates an example of a method for adding a blockchain transaction to a blockchain.

FIG. 5 illustrates an example of a method for adding a blockchain transaction to a blockchain. This method may be performed by a CLI 220, a command manager 230, a transaction plug-in 231, and a blockchain SDK 240. The method illustrated in FIG. 5 may begin at step 510, where the CLI 220 may receive a user input. The user input may be aided by an interactive environment provided by the CLI 220 that includes services such as command pre-processing, command suggestions, or command history display. The user input may be entered in a terminal emulator or a graphical user interface. It may be entered in its entirety or in multiple parts. At step 520, the CLI 220 may send the user input to the command manager 230. At step 530, the command manager 230 may interpret the user input to determine a blockchain-related operation corresponding to the user input. In this example, the operation may be adding a specified blockchain transaction to the blockchain. At step 540, the command manager 230 may call the transaction plug-in 231 based on the nature of the determined operation to add a blockchain transaction. At step 550, the transaction plug-in 231 may generate the blockchain transaction corresponding to the user input and a command to add the generated blockchain transaction to the blockchain. At step 560, the transaction plug-in 231 may feed the blockchain transaction and the command to the blockchain SDK 240 and call an API for sending blockchain transactions associated with the SDK 240. At step 570, based on the command, the blockchain SDK 240 may send the blockchain transaction to one or more nodes associated with the blockchain, which may then send the blockchain transaction to one or more other nodes in the network associated with the blockchain. In this manner, the blockchain transaction corresponding to the user input may be added to the blockchain. In some embodiments, the blockchain network may verify the blockchain transaction, add the blockchain transaction to a block, and link the block to the blockchain. A result associated with the command to add blockchain transaction to the blockchain may then be accessible to the user via the console 200.

Figure 6:
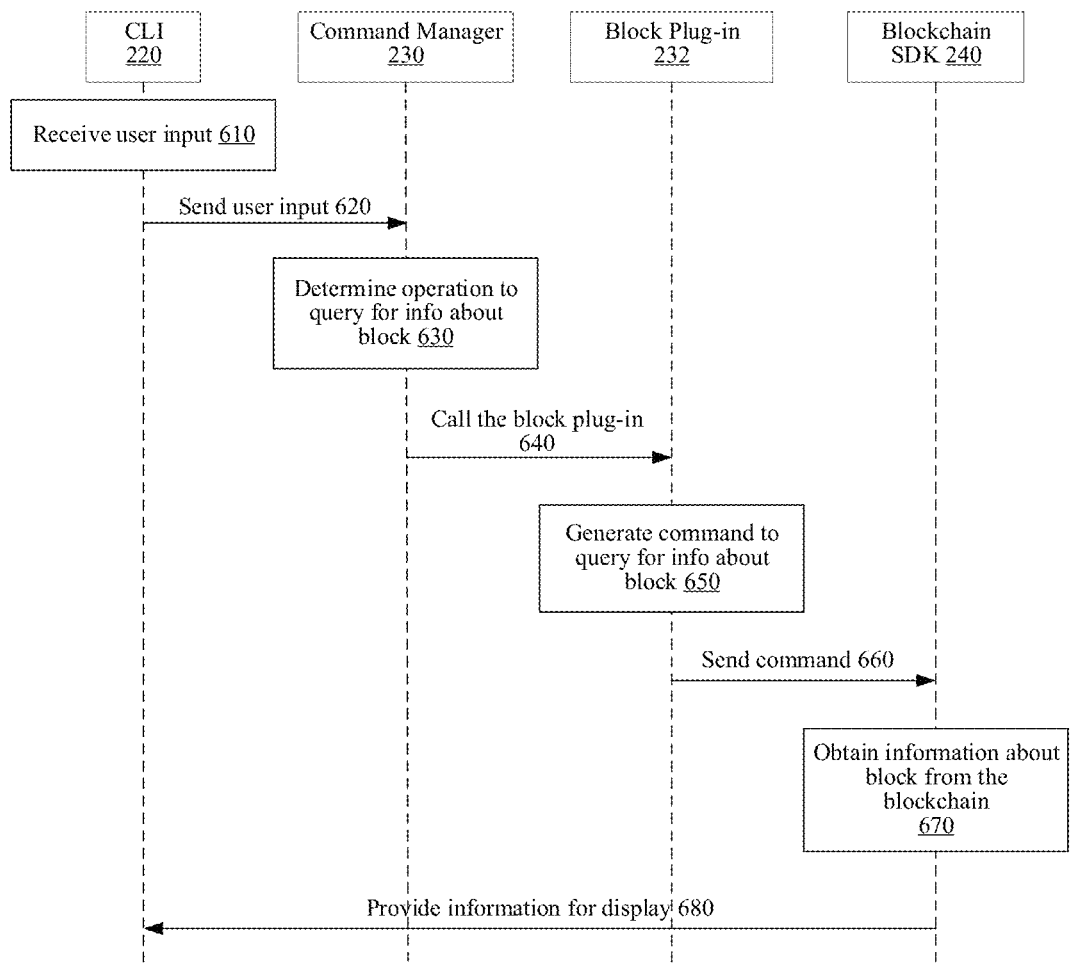
FIG. 6 illustrates an example of a method for querying for information about a block associated with a blockchain.

FIG. 6 illustrates an example of a method for querying for information about a block associated with a blockchain. This method may be performed by a CLI 220, a command manager 230, a block plug-in 232, and a blockchain SDK 240. The method may begin at step 610, where the CLI 220 may receive a user input. The CLI 220 may process the user input and send the result to the command manager 230 at step 620. At step 630, the command manager 230 may interpret the user input to determine a blockchain-related operation corresponding to the user input. In this example, the operation may be querying for information about a block associated with the blockchain. At step 640, the command manager 230 may call the block plug-in 232 based on the nature of the determined operation to query for block information. At step 650, the block plug-in 232 may generate a command to query for information about the block identified in the user input. At step 660, the block plug-in 232 may feed the command to the blockchain SDK 240 and call an API for querying for information about the blockchain. At step 670, the blockchain SDK 240 may obtain information about the identified block from one or more nodes of a network associated with the blockchain. At step 680, the obtained information may be provided in the CLI 220.

Figure 7:
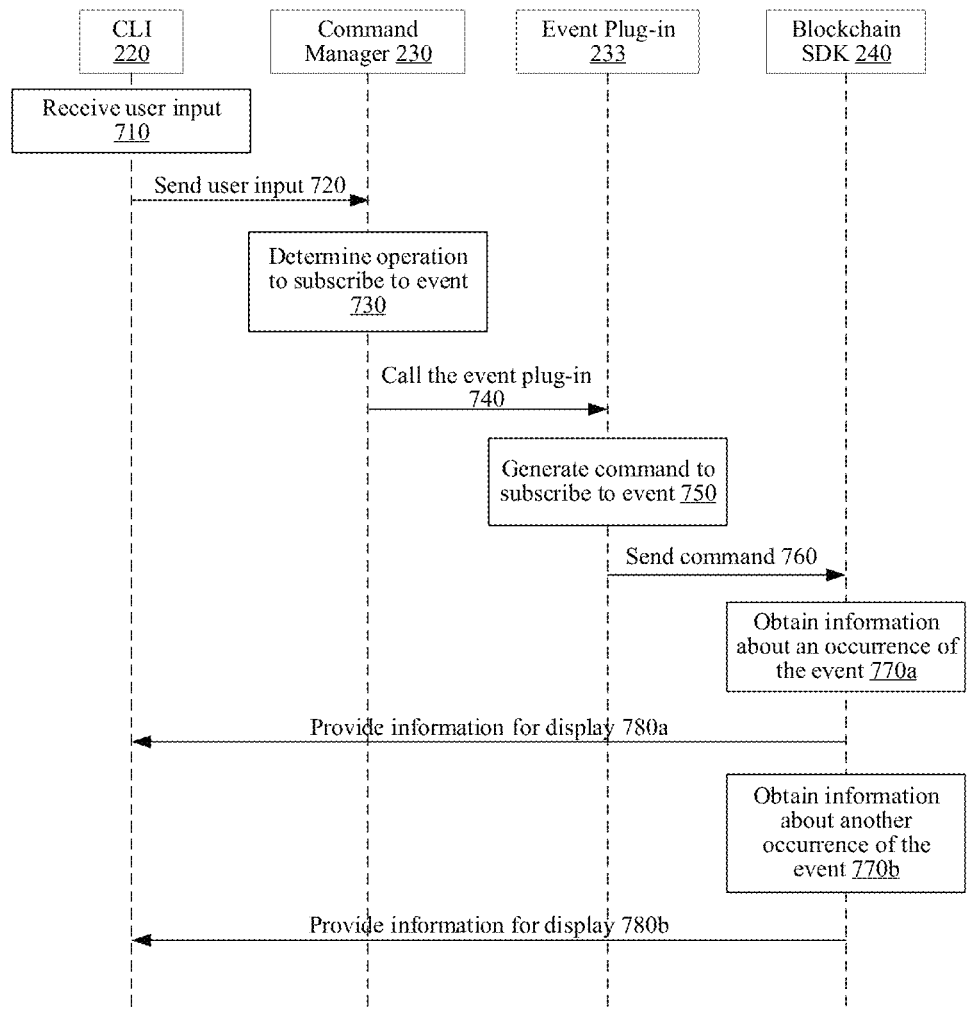
FIG. 7 illustrates an example of a method for subscribing to events associated with a blockchain.

FIG. 7 illustrates an example of a method for subscribing to events associated with a blockchain. This method may be performed by a CLI 220, a command manager 230, an event plug-in 233, and a blockchain SDK 240. The method may begin at step 710, where the CLI 220 may receive a user input. The CLI 220 may process the user input and send the result to the command manager 230 at step 720. At step 730, the command manager 230 may interpret the user input to determine a blockchain-related operation corresponding to the user input. In this example, the operation may be subscribing to events having particular characteristics (e.g., addition of new blocks, changes to a particular blockchain contract, updates of a particular account, blockchain transactions of a particular type, blockchain transactions of a particular topic). At step 740, the command manager 230 may call the event plug-in 233 based on the nature of the determined operation to subscribe to events. At step 750, the event plug-in 233 may generate one or more commands corresponding to subscribing to events fitting the characteristics. At step 760, the event plug-in 233 may feed the one or more commands to the blockchain SDK 240 and call an API for querying for information about relevant events associated with the blockchain. At step 770*a*, the blockchain SDK 240 may obtain information about an occurrence of the subscribed-to event from one or more nodes of a network associated with the blockchain. At step 780*a*, the obtained information may be provided for display in the CLI 220. Then, at step 770*b*, the blockchain SDK 240 may obtain information about another occurrence of the subscribed-to event from one or more nodes of a network associated with the blockchain. At step 780*b*, the obtained information may be provided for display in the CLI 220. Until receiving a command indicating that the subscription shall be terminated, the blockchain SDK 240 may repeat steps 770 (a or b) and 780 (a or b) when an event fitting the characteristics indicated in the user input occurs.

Figure 8:
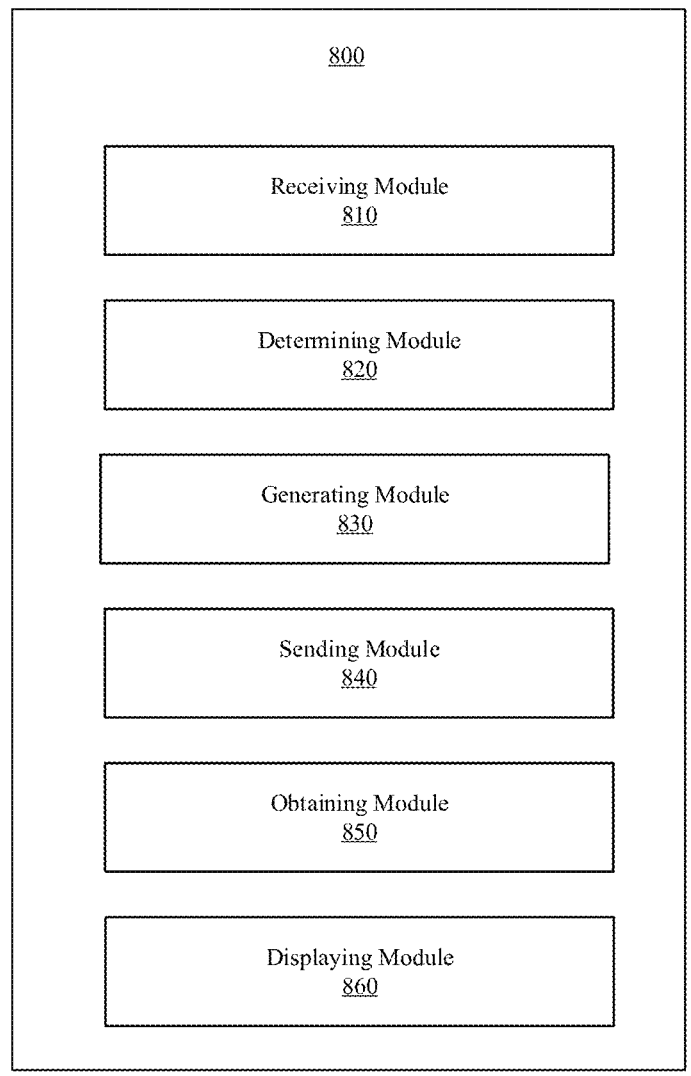
FIG. 8 illustrates a block diagram of an example of a computer system for managing user interactions with a blockchain.

FIG. 8 illustrates a block diagram of an example of a computer system 800 for managing user interactions with a blockchain. The system 800 may be an example of an implementation of one or more components of the device 120 of FIG. 1. The method 400 may be implemented by the computer system 800. The computer system 800 may comprise one or more processors and one or more non-transitory computer-readable storage media (e.g., one or more memories) coupled to the one or more processors and configured with instructions executable by the one or more processors to cause the system or device (e.g., the processor) to perform the above-described method, e.g., the method 400. The computer system 800 may comprise various units/modules corresponding to the instructions (e.g., software instructions). In some embodiments, the computer system 800 may be referred to as an apparatus for managing user interactions with a blockchain. The apparatus may comprise a receiving module 810 for receiving a user input, wherein the user input comprises a reference to one or more configurations; a determining module 820 for determining, based on the user input, a blockchain-related operation and a command plug-in associated with the blockchain-related operation; a generating module 830 for generating, by the determined command plug-in, a command based on the determined operation and the one or more configurations; a sending module 840 for sending the command to one or more nodes associated with the blockchain; an obtaining module 850 for obtaining an output in response to the command from the blockchain; and a displaying module 860 for providing the output.

As shown in FIG. 8, by determining a blockchain-related operation based on a user input, generating a command based on the determined operation, and sending the command to the blockchain, the user input may be automatically converted to a command compatible with the blockchain. By obtaining an output in response to the command from the blockchain and providing the output for display, information associated with the blockchain may be converted to information conceivable to a user. A plurality of commands may be registered for use by a user to carry out operations associated with the blockchain without substantial effort in inputting command information or configuration information. Furthermore, the apparatus enables the use of a standardized manner of input to interact with various blockchains having different protocols or programming languages.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof. For example, the virtual machine may include an Ethereum Virtual Machine (EVM) software that provides the runtime environment for smart contracts in Ethereum.

Figure 9:
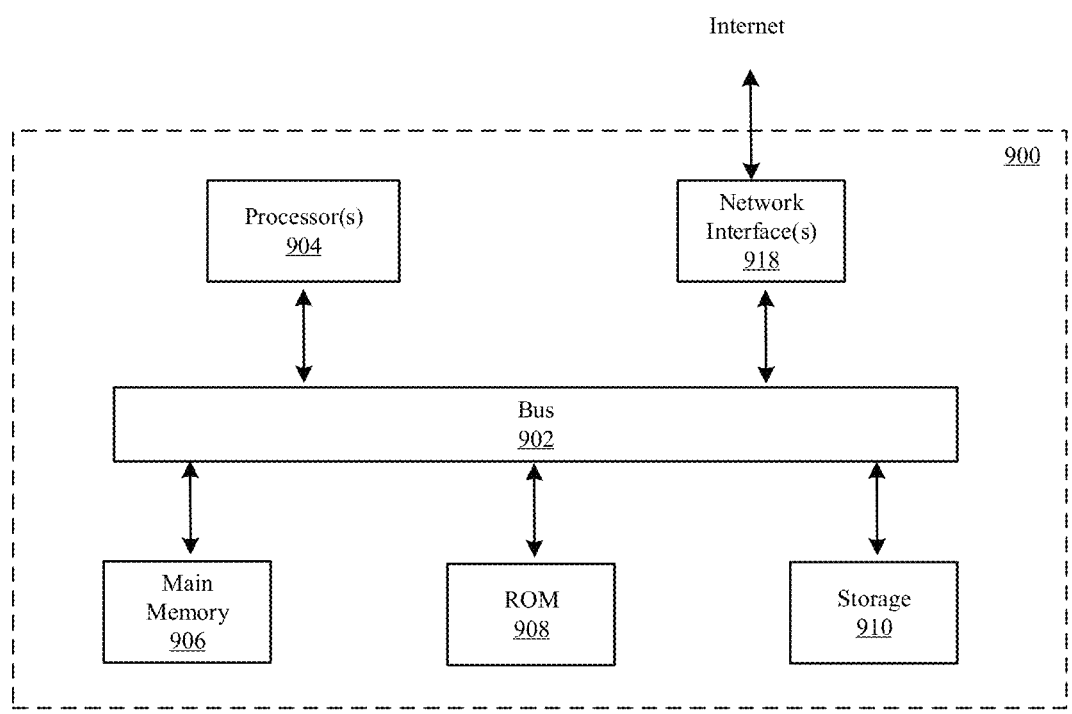
FIG. 9 illustrates a block diagram of an example of a computer system in which any of the embodiments described herein may be implemented.

FIG. 9 illustrates a block diagram of an example of a computer system 900 in which any of the embodiments described herein may be implemented. The system 900 may be implemented in any of the nodes 115 associated with a blockchain and configured to perform corresponding steps for blockchain operations described herein. The system 900 may be implemented in a device 120 that communicate with one or more nodes 115 associated with a blockchain. The console 200 or one or more of its components described herein may be implemented on one or more computer systems 900. One or more of the example methods illustrated by FIGS. 3-7 may be performed by the computer system 900.

The computer system 900 may include a bus 902 or other communication mechanism for communicating information, one or more hardware processor(s) 904 coupled with bus 902 for processing information. Hardware processor(s) 904 may be, for example, one or more general purpose microprocessors.

The computer system 900 may also include a main memory 906, such as a random access memory (RAM), cache and/or other dynamic storage devices, coupled to bus 902 for storing information and instructions executable by processor(s) 904. Main memory 906 also may be used for storing temporary variables or other intermediate information during execution of instructions executable by processor(s) 904. Such instructions, when stored in storage media accessible to processor(s) 904, render computer system 900 into a special-purpose machine that is customized to perform the operations specified in the instructions. The computer system 900 may further include a read only memory (ROM) 908 or other static storage device coupled to bus 902 for storing static information and instructions for processor(s) 904. A storage device 910, such as a magnetic disk, optical disk, or USB thumb drive (Flash drive), etc., may be provided and coupled to bus 902 for storing information and instructions.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the operations, methods, and processes described herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 may cause processor(s) 904 to perform the process steps described herein. In alternative embodiments, hard-wired circuitry may be used in place of or in combination with software instructions.

The main memory 906, the ROM 908, and/or the storage 910 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 900 may include a network interface 918 coupled to bus 902. Network interface 918 may provide a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 may send and receive electrical, electromagnetic or optical signals that carry digital data streams representing various types of information.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor(s) 904 as it is received, and/or stored in storage device 910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned.

The invention claimed is:

1. A computer-implemented method for managing user interactions with a blockchain, the method comprising:
   receiving a user input in a command line interface (CLI), wherein the user input comprises a reference to one or more configurations;
   determining, by a command manager based on the user input, a blockchain-related operation and a command plug-in associated with the blockchain-related operation;
   generating, by the determined command plug-in, a command based on the determined operation and the one or more configurations; and
   sending, by a software development kit (SDK) associated with the blockchain, the command to one or more nodes associated with the blockchain.

2. The method of claim 1, further comprising:
   obtaining, by the SDK, an output in response to the command from the blockchain; and
   providing the output in the CLI.

3. The method of claim 1, further comprising, before the receiving a user input, initializing a console for managing user interactions with the blockchain, wherein the console comprises a mainframe, the CLI, the command manager, a plurality of command plug-ins, and the SDK, and wherein the initializing comprises:
   starting the mainframe associated with the console;
   generating, by the mainframe, an instance of the CLI;
   initializing, by the CLI, the SDK based on one or more configurations associated with one or more nodes associated with the blockchain;
   calling, by the CLI, the command manager; and
   loading, by the command manager, the command plug-ins for registration into the instance of the CLI.

4. The method of claim 3, wherein the console further comprises a tool manager configured to:
   calculate a hash value;
   calculate a digital signature; or
   verify a blockchain transaction.

5. The method of claim 1, wherein the CLI is configured to:
   pre-process the user input;
   provide a historical record of user inputs; or
   provide a recommended command.

6. The method of claim 1, wherein:
   the command manager is configured to register or remove one or more commands.

7. The method of claim 6, wherein:
   the command manager is configured to provide, in the CLI, a list of registered commands and information about the registered commands.

8. The method of claim 1, wherein the command plug-in comprises:
   a transaction plug-in;
   a block plug-in; or
   an event plug-in.

9. The method of claim 8, wherein the transaction plug-in is configured to generate:
   a command for adding a blockchain transaction to the blockchain;
   a command for querying for information about one or more blockchain transactions associated with the blockchain; or
   a command for querying for information about one or more accounts associated with the blockchain.

10. The method of claim 8, wherein the block plug-in is configured to generate:
    a command for querying for information about a block associated with the blockchain; or
    a command for querying for information about a block header associated with the blockchain.

11. The method of claim 8, wherein the event plug-in is configured to generate:
    a command for subscribing to events related to a blockchain contract associated with the blockchain;
    a command for subscribing to events related to a block associated with the blockchain;
    a command for subscribing to events related to an account associated with the blockchain; or
    a command for subscribing to events related to a topic associated with the blockchain.

12. The method of claim 1, wherein the sending the command to one or more nodes associated with the blockchain comprises:
    obtaining, from the user input, a reference to the blockchain;
    selecting, from a plurality of SDKs, the SDK associated with the referenced blockchain; and
    feeding the generated command to the SDK.

13. The method of claim 1, wherein:
    the blockchain is a consortium blockchain.

14. A system for managing user interactions with a blockchain, comprising a processor and a non-transitory computer-readable storage medium storing instructions executable by the processor to cause the system to perform operations comprising:

receiving a user input in a command line interface (CLI), wherein the user input comprises a reference to one or more configurations;

determining, by a command manager based on the user input, a blockchain-related operation and a command plug-in associated with the blockchain-related operation;

generating, by the determined command plug-in, a command based on the determined operation and the one or more configurations; and sending, by a software development kit (SDK) associated with the blockchain, the command to one or more nodes associated with the blockchain.

15. The system of claim 14, wherein the operations further comprise:

obtaining, by the SDK, an output in response to the command from the blockchain; and providing the output in the CLI.

16. The system of claim 14, wherein the operations further comprise, before the receiving a user input, initializing a console for managing user interactions with the blockchain, wherein the console comprises a mainframe, the CLI, the command manager, a plurality of command plug-ins, and the SDK, and wherein the initializing comprises:

starting the mainframe associated with the console;

generating, by the mainframe, an instance of the CLI;

initializing, by the CLI, the SDK based on one or more configurations associated with one or more nodes associated with the blockchain;

calling, by the CLI, the command manager; and loading, by the command manager, the command plug-ins for registration into the instance of the CLI.

17. The system of claim 16, wherein the console further comprises a tool manager configured to:

calculate a hash value;

calculate a digital signature; or verify a blockchain transaction.

18. The system of claim 14, wherein the CLI is configured to:

pre-process the user input;

provide a historical record of user inputs; or provide a recommended command.

19. The system of claim 14, wherein:

the command manager is configured to register or remove one or more commands.

20. A non-transitory computer-readable storage medium for managing user interactions with a blockchain, configured with instructions executable by one or more processors to cause the one or more processors to perform operations comprising:

receiving a user input in a command line interface (CLI), wherein the user input comprises a reference to one or more configurations;

determining, by a command manager based on the user input, a blockchain-related operation and a command plug-in associated with the blockchain-related operation;

generating, by the determined command plug-in, a command based on the determined operation and the one or more configurations; and sending, by a software development kit (SDK) associated with the blockchain, the command to one or more nodes associated with the blockchain.

* * * * *